United States Patent [19]

Ishikawa

[11] Patent Number: 5,052,697
[45] Date of Patent: Oct. 1, 1991

[54] SEALING MEMBER FOR FERROFLUID SEAL AND METHOD OF PRODUCING THE SAME

[75] Inventor: Ryuhei Ishikawa, Tokyo, Japan

[73] Assignee: Nippon Ferrofluidics Corporation, Tokyo, Japan

[21] Appl. No.: 444,171

[22] PCT Filed: Mar. 31, 1989

[86] PCT No.: PCT/JP89/00342
§ 371 Date: Nov. 29, 1989
§ 102(e) Date: Nov. 29, 1989

[87] PCT Pub. No.: WO89/09355
PCT Pub. Date: Oct. 5, 1989

[30] Foreign Application Priority Data

Mar. 31, 1988 [JP] Japan .................. 63-80606

[51] Int. Cl.⁵ .......................... F16J 15/40
[52] U.S. Cl. ........................ 277/80; 277/135
[58] Field of Search ............ 277/80, 135; 156/253

[56] References Cited

U.S. PATENT DOCUMENTS 4,289,565  9/1981  Wilkins ................. 156/253

FOREIGN PATENT DOCUMENTS 0155065  8/1985  Japan ..................... 277/80
1308803  5/1987  U.S.S.R. ................. 277/80

Primary Examiner—William A. Cuchlinski, Jr.
Assistant Examiner—Daniel G. DePumpo
Attorney, Agent, or Firm—Armstrong, Nikaido, Marmelstein, Kubovcik & Murray

[57] ABSTRACT

The present invention relates to an annular sealing member (7) arranged so as to surround the periphery of a working member such as a shaft (10). This sealing member (7) is produced by sticking a sheet (1) of elastic magnet to pole piece-constructing sheets (2,2), and punching the resulting assembly. The annular portion of said sheet (1) of elastic magnet is pressed to be contracted in the direction of thickness and stretched in the radial direction by said punching. As a result, the circumferential portion of the above described annular magnet (8) is dislocated so as to be sunk from the periphery of said annular pole pieces (9,9). Accordingly, the dimensional accuracy of inner and outer circumferences of the sealing member (7) is improved.

7 Claims, 2 Drawing Sheets

SEALING MEMBER FOR FERROFLUID SEAL AND METHOD OF PRODUCING THE SAME

TECHNICAL FIELD

This invention relates to a sealing member for a ferrofluid seal and a method of producing the same, more specifically to a sealing member which can be fabricated by bonding a sheet of elastic magnet with pole piece-constituting sheets, and punching the resulting laminate.

TECHNICAL BACKGROUND

Sealing devices utilizing ferrofluid are known as described, for example,, in Japanese Patent Publication No. 24585/1986. Such a sealing device has an annular sealing member 52 disposed so as to surround the circumference of a shaft 51, as shown in FIG. 6. This sealing member 52 consists of an annular magnet 53 and a pair of pole pieces 54,54 bonded onto both sides of the annular magnet 53, with a ferrofluid 55 being interposed between the internal circumferential surfaces of the annular pole pieces 54,54 and the external circumferential surface of the shaft 51, whereby to function as a sealer.

In the constitution of the conventional sealing member 52, an annular magnet 53 and annular pole pieces 54,54 are shaped in separate steps, and then they are bonded together, owing to the reason described below. Namely, since the inner diametrical size of the sealing member 52 is a factor which defines the size of the gap between the sealing member 52 and the shaft 51 and significantly influences the sealing performance of the sealing device, whereas the outer diametrical size of the sealing member is a factor which significantly influences the assembling feasibility with the member for fixing the sealing member 52, it is necessary to maintain the inner and outer diametrical sizes of the sealing member 52 to have good accuracy. However, in the conventional sealing member 52, the annular pole pieces 54,54 are formed to have optimum dimensional accuracy, whereas the annular magnet 53 is formed to have an inner diametrical size slightly greater than that of the annular pole pieces 54, 54 and an outer diametrical size slightly smaller than that of the annular pole pieces 54,54, whereby the internal and external circumferential surfaces of the annular magnet 53 are adapted not to extend over the internal and external circumferential surfaces of the respective annular pole pieces 54,54, correspondingly, to maintain dimensional accuracy.

However, even in such sealing members as obtained according to the production process described above, sufficient accuracy may sometimes not be attained if the circumferential surface of the annular magnet 53 happens to extend over the circumferential surfaces of the annular pole pieces 54, 54 during the bonding operation. The above process also involves a problem that it requires much difficulty in the bonding operation.

This invention has been accomplished for the purpose of solving the above problems of prior art and is directed to provide a sealing member for a ferrofluid seal which can be produced with easier procedures and has improved dimensional accuracy and a method of producing the same.

These and other objects of this invention will become more apparent from the following description of the preferred embodiment.

DISCLOSURE OF THE INVENTION

The sealing member for ferrofluid seal according to this invention is an annular sealing member to be disposed so as to surround the external circumferential surface of a working member such as a shaft, consisting of an annular magnet and annular pole pieces, which form a ferrofluid seal by interposing a ferrofluid between the sealing member and the working member, wherein the sealing member is fabricated by bonding a sheet of elastic magnet with pole piece-constituting sheets and by punching the resulting laminate, wherein the sheet of elastic magnet is pressed at an annular portion to have a reduced thickness and an increased diameter when it is punched out, whereby the circumferences of the annular magnet after the punching are shifted in the directions to recede from the corresponding circumferential surfaces of the annular pole pieces.

On the other hand, in the method of producing the sealing member for ferrofluid seal by bonding a sheet of elastic magnet with pole piece-constituting sheets, and punching out the resulting laminate into an annular member to fabricate a sealing member comprising an annular magnet and annular pole pieces, the sheet of elastic magnet is pressed at an annular portion to have a reduced thickness and an increased diameter when it is punched out, whereby the circumferences of the annular magnet after the punching operation are shifted in the directions to recede from the corresponding circumferential surfaces of the annular pole pieces.

Further, in the above sealing member and the method of producing the same, the inner circumferential portion of at least one of the two annular pole pieces is preferably designed to be bent inwardly in the direction of thickness after the annular magnet is sandwiched between the pair of annular pieces.

The sealing member for ferrofluid seal and the method of producing the same are characterized by the functions as described below. Namely, after completion of the punching, the annular magnet undergoes compressive deformation due to its elasticity outwardly along the inner circumference and inwardly along the outer circumference, respectively, and thus a sealing member with good accuracy can be obtained corresponding to the accuracy of the punched annular pole pieces. Moreover, the annular magnet and the annular pole pieces can be bonded together beforehand to require only a single punching operation, so that the working efficiency can also be improved.

Further, since the bend of the annular pole piece can be formed to define a space corresponding to the level of the laterally expanded portion of the ferrofluid to require no extra fitting space which must otherwise be secured due to the lateral expansion of the ferrofluid, not only the sealing member can be used in a compact state but the assembling feasibility can be improved.

MOST PREFERRED EMBODIMENT OF THE INVENTION

An embodiment of the present sealing member for ferrofluid seal and a method of producing the same will be described below specifically.

Figure 2:
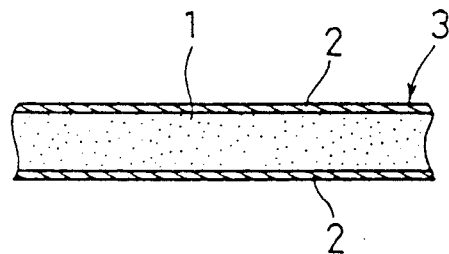
FIGS. 2 to 5 show sequentially an exemplary process for producing said sealing member.
Figure 3:
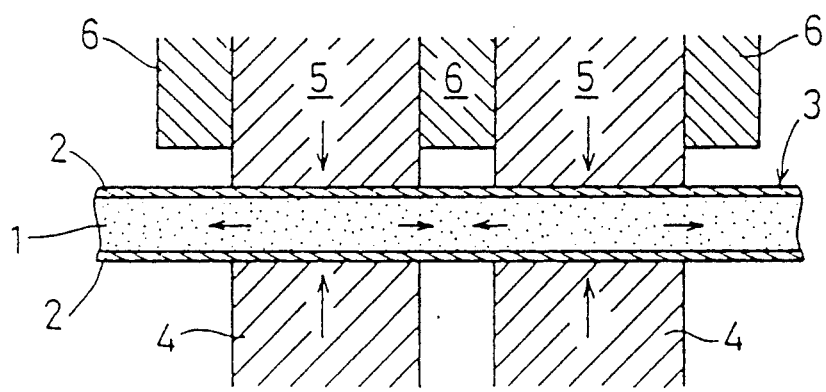
Figure 4:
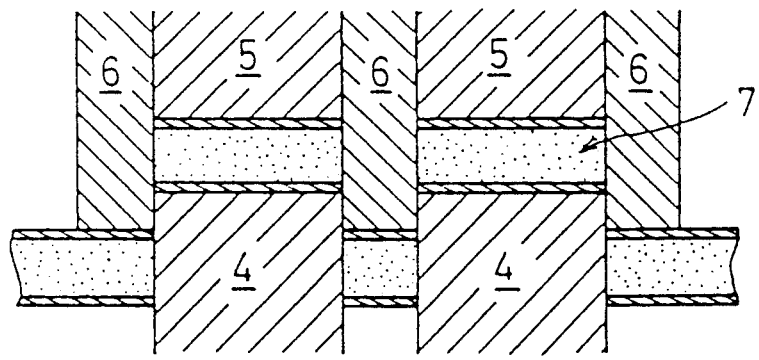

As shown in FIG. 2, pole piece-constituting sheets 2,2 are first bonded to both sides of a sheet of elastic magnet 1 to prepare a laminate 3. The elastic magnet sheet 1 and the pole piece-constituting sheets 2,2 may be made of a rubbery magnet (obtained by incorporating a magnetic powder such as ferrite into an elastomeric material such as rubber) and a magnetic material such as stainless steel, respectively. Both members may preferably be bonded together substantially over the entire surfaces using a synthetic rubber adhesive. The thus obtained laminate 3 is then punched out to form an annular sealing member. When the laminate 3 is punched, an annular portion to be punched out is retained with pressure between a die 4 and a holding jig 5, as shown in FIG. 3. Accordingly, the sheet of elastic magnet 1 at the annular portion to be punched out is maintained in a state where it is compressively deformed in the direction of thickness and elongated in the direction of its diameter. In FIG. 3, the die 4 has a continuous annular shape having uniform cross sections over the entire circumference. The punch 6 also has a continuous annular groove with uniform cross sections over the entire circumference which slide on the internal and external circumferential surfaces of the annular die 4. In this state, the punch 6 is descended to punch out the laminate 3 into a continuously annular sealing member 7 having uniform cross sections over the entire circumference as shown in FIG. 4.

Figure 5:
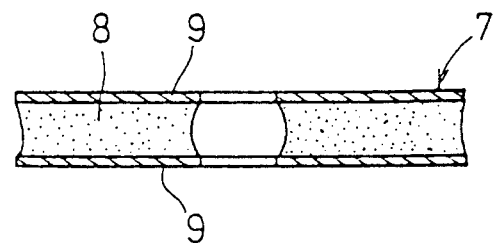

When the thus formed sealing member 7 is removed or freed from the punching apparatus, in other words when the pressing force of the holding jig 5 is released, the annular magnet 8 having a continuous circumference resumes its natural posture because of its elasticity, i.e. it comes to have an increased thickness and a reduced diameter. Consequently, as shown in FIG. 5, the internal and external peripheral surfaces of the annular magnet 8 assume a state that they recede from the corresponding peripheral surfaces of the respective pole pieces 9,9, whereby excellent dimensional accuracy in the inner and outer diameters of the sealing member 7 can be achieved corresponding to the dimensional accuracy of the punched annular pole pieces 9,9. The annular pole pieces 9,9 are also formed into an annular shape which is continuous over the entire circumference.

Figure 1:
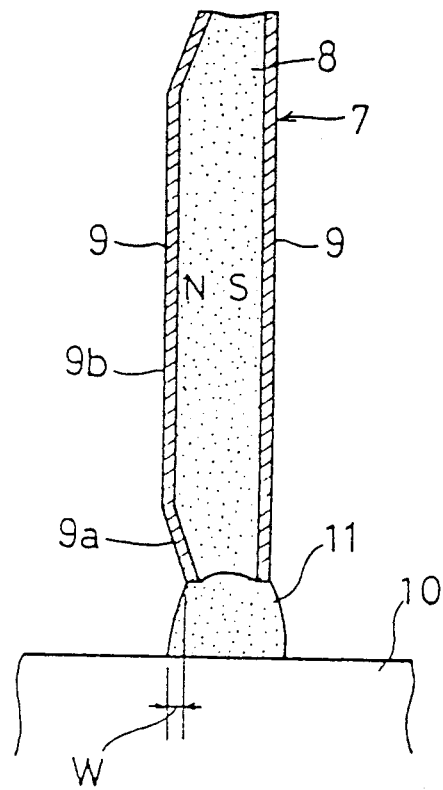
FIG. 1 shows in cross section the,,major part of an embodiment of the sealing member for ferrofluid seal according to this invention.
Figure 6:
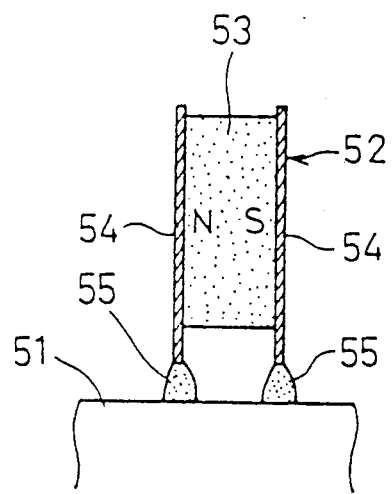
FIG. 6 illustrates an embodiment of a prior art sealing member.

FIG. 1 illustrates an exemplary application of the sealing member 7 In the same drawing showing the upper half of the sealing member 7 in vertical cross section, the reference numerals 10 and 11 respectively show a shaft and a ferrofluid. It should be noted, however, that in the same drawing the inner circumferential portion 9a of one annular pole piece 9 is bent inwardly in the direction of thickness of the sealing member 7 or in the direction such that the thickness of the sealing member 7 may be reduced gradually toward the inside. The process of forming such bend 9a may be explained as follows: The punch 6 assuming a posture shown in FIG. 3 is first descended gradually to be brought into contact with the surface of the laminate 3 and further to press the laminate 3, whereby the vicinity of the shear portion of the elastic magnetic sheet 1 is subjected to further compressive deformation together with the pole piece-constituting sheet 2 facing the punch 6. When the pressurization force of the punch 6 is further increased than in the above state, the laminate 3 is punched under shear, and the bending and deformation experienced immediately before the punching remain as such to form the bend 9a. Accordingly, while such bend 9a is formed likewise along the outer peripheral portion of the annular pole piece 9 facing the punch 6, the annular pole piece 9 facing the die 4 is maintained substantially flat.

The presence of such bend 9a yields the following advantage: As shown in FIG. 1, while the ferrofluid 11 laterally expands gradually toward the shaft 10, the ferrofluid 11 may be prevented from protruding outwardly from the lateral face 9b of the annular pole piece 9 in use if the level of reduction in the thickness is designed to be greater than the level of expansion W in the ferrofluid 11. Namely, when the sealing member 7 is used being fitted on a working member, the lateral surface 9b of the annular pole piece 9 can be positioned in place and in close contact to require no extra space on the lateral side of the sealing member 3 to enable use of said member in a compact state. Incidentally, the ferrofluid 11 of course dwells continuously and uniformly over the entire inner circumference of the sealing member 7.

In the sealing member 7, since the annular magnet 8 and the annular pole pieces 9,9 can be bonded together over the entire surfaces, the inconvenience of the prior art that the ferrofluid intrudes into the gaps between the two members formed due to the failure of adhesion to bring about the reduction in the amount of the fluid retained in position can be obviated.

EFFECT OF THE INVENTION

According to the present sealing member for ferrofluid seal and the method of producing the same, a sealing member with good accuracy can be obtained corresponding to the accuracy of the punched annular pole pieces. Since the annular magnet and the annular pole pieces can be bonded together beforehand and only a single punching operation is required, working efficiency can be improved.

Further, the bend in the annular pole piece can be formed to define a space corresponding to the laterally expanded portion of the ferrofluid, so that the fitting space which must otherwise be secured due to the laterally expanded portion of the ferrofluid will become unnecessary to enable use of the the sealing member in a compact state and improve the assembling feasibility.

INDUSTRIAL UTILITY

As has been described above, the sealing member according to this invention can be used as the one for sealing shaft and the like, particularly as such sealing member that is required to have high accuracy in the inner and outer circumferential dimensions.

I claim:

1. A sealing member for a ferrofluid seal to surround an external surface of a working member to interpose ferrofluid between said sealing member and said working member, said sealing member comprising:
   an annular elastic magnet composed of an elastomeric material having incorporated therein a magnetic powder, said magnet having two substantially planar side surfaces and inner and outer circumferential surfaces; and
   a pair of annular pole pieces bonded, respectively, to each side surface of said annular elastic magnet said bonding extending over entire side surfaces of said annular pole pieces;
wherein said annular elastic magnet inner circumferential surface forms an area recessed from inner circumferences of said pole pieces.

2. A sealing member as recited in claim 1, wherein inner and outer circumferential edges of one of said pole pieces are bent inwardly toward the other pole piece so as to compress inner and outer circumferential areas of said annular elastic magnet.

3. A sealing member as recited in claim 1, wherein the inner circumferential edges of said pole pieces are spaced such that, when surrounding said working member, ferrofluid interposed between said sealing member and said working member dwells continuously over the entire inner circumference of the sealing member including said elastic magnet inner recessed area.

4. A method of producing a sealing member for ferrofluid seal comprising the steps of:
   forming a laminated sheet material by bonding a sheet of magnetic material to each side of an elastic magnet sheet; and
   punching out an annular shape of said laminated sheet material to form a sealing member having a pair of pole pieces bonded, respectively, to each side surface of an annular elastic magnet.

5. A method of producing a sealing member as recited in claim 4, comprising the further step of applying compressive force to deform the elastic magnet sheet of said laminated sheet material at the time of punching said annular shape, such that after punching and release of said compressive force, inner and outer circumferential surfaces of said elastic magnet sheet of the sealing member recede from corresponding circumferential surfaces of said pole pieces.

6. A method of producing a sealing member as recited in claim 4, comprising the further step of applying compressive deformation to said laminated sheet material at a vicinity of shear of said punching out step so as to bend inner and outer circumferential areas of one pole piece toward the other pole piece, whereby inner and outer circumferential areas of said elastic magnet sheet are maintained in compression when the punching out step is completed.

7. A method of producing a sealing member as recited in claim 6, comprising the further step of applying compressive force to deform the elastic magnet sheet of said laminated sheet material at the time of punching said annular shape, such that after punching and release of said compressive force, inner and outer circumferential surfaces of said elastic magnet sheet of the sealing member recede from corresponding circumferential surfaces of said pole pieces.

* * * * *